Patented Jan. 2, 1923.

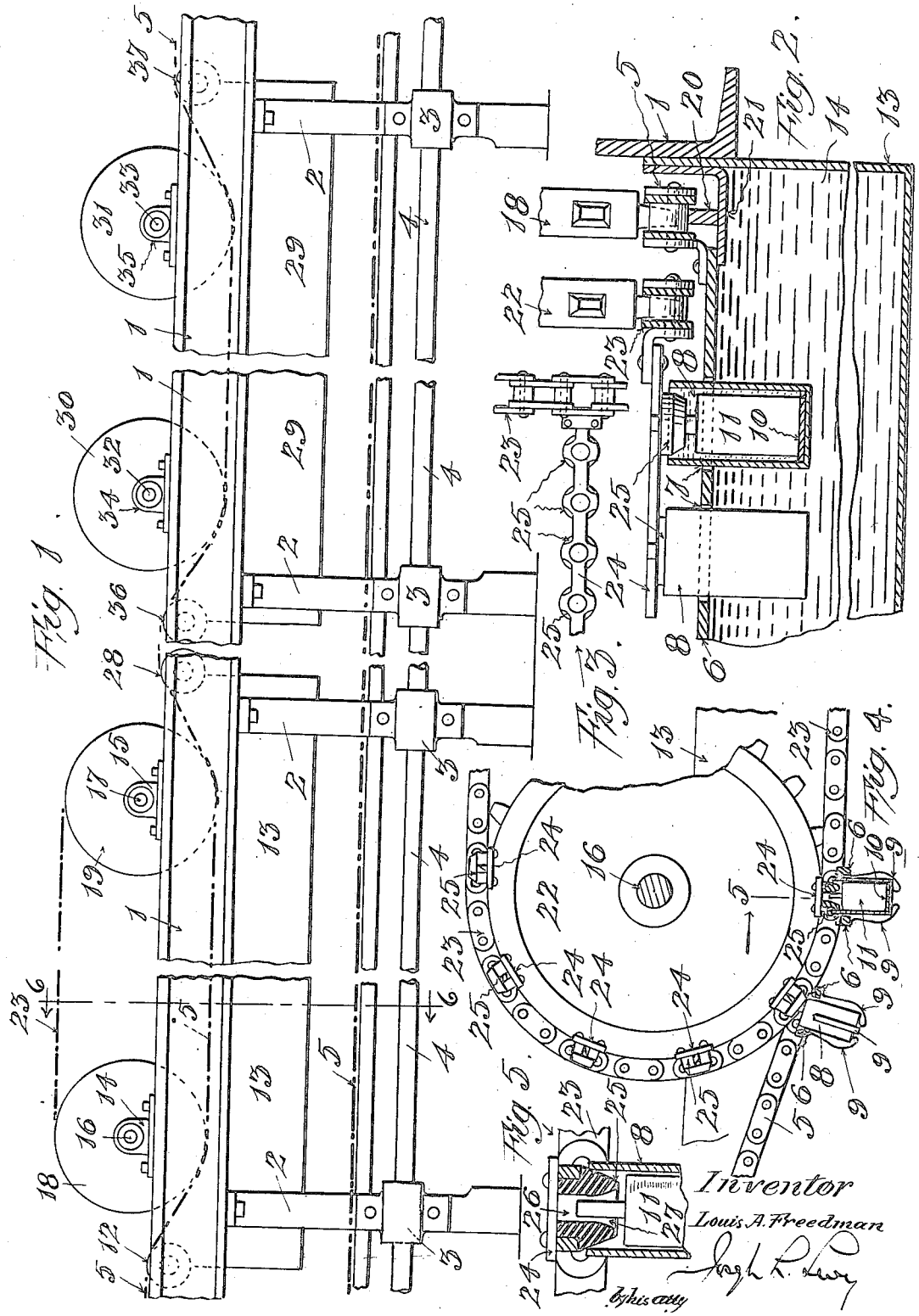

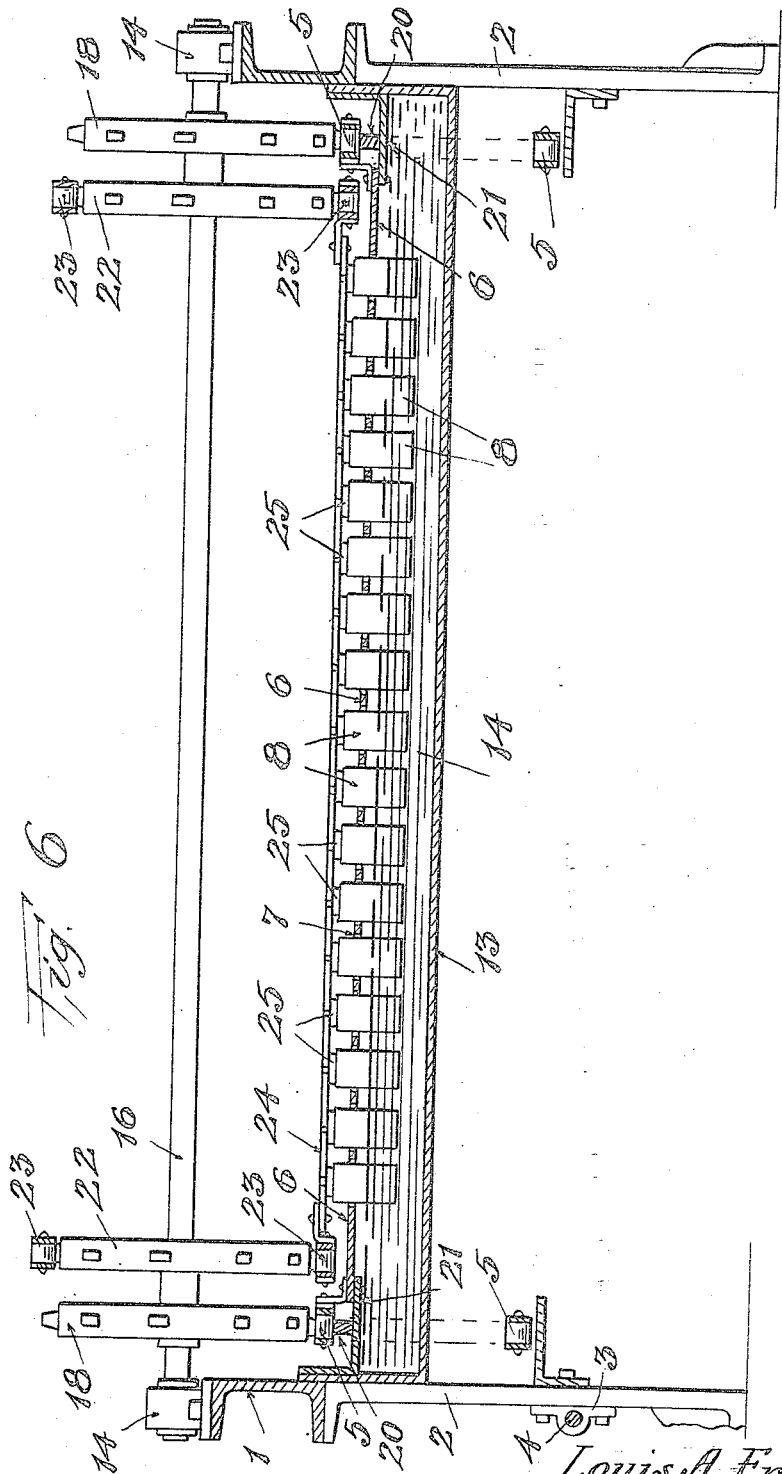

1,441,077

UNITED STATES PATENT OFFICE.

LOUIS A. FREEDMAN, OF NEW YORK, N. Y.

HEATING AND COOLING DEVICE FOR BATTERY-MAKING MACHINES.

Original application filed May 13, 1916, Serial No. 97,441. Divided and this application filed December 18, 1919, Serial No. 345,917. Renewed December 4, 1922.

*To all whom it may concern:*

Be it known that I, LOUIS A. FREEDMAN, a citizen of the United States, and a resident of the city, county, and State of New York, have invented a certain new and useful Improvement in Heating and Cooling Devices for Battery-Making Machines, of which the following is a specification.

This invention relates to a machine for manufacturing dry batteries and the object of this invention is to provide a means for hardening or solidifying the contents of dry batteries by cooking or heating the filled battery shells or cooling the same, if a cooling action is desired.

With these objects, and other objects which may hereinafter appear, in view, I have devised the particular arrangement of parts hereinafter set forth, and more particularly pointed out in the claims appended hereto.

This application is a division of my copending application Serial No. 97,441, filed May 13th, 1916.

Reference is to be had to the accompanying drawing, forming a part hereof, in which—

Figure 1 is a side elevation of a portion of a dry battery making machine, provided with my improved heating and cooling apparatus, Figure 2 is a sectional view of the heating tank, and a portion of the conveyor, which carries the battery shells, Figure 3 is a plan view of a portion of the core-centering mechanism, Figure 4 is a side elevation of one of the sprockets for driving the core-centering means together with its chains, and Figure 5 is a sectional view on the line 5—5 of Figure 4, looking in the direction of the arrows.

Figure 6 is a sectional view on the line 6—6 of Figure 1, looking in the direction of the arrows.

Throughout the various views of the drawings, similar reference characters designate similar parts.

In the preferred embodiment of my invention, as disclosed in the accompanying drawing, the frame of my improved machine comprises a pair of suitable side members 1, which are connected by cross members and supported upon legs 2. The legs 2 are provided with bearings 3 in which the main shaft or cam-shaft 4 of the machine rotates, said shaft being driven by any suitable source of power.

The frame of the machine is a continuous, long member, the entire length of which is not shown, and which is provided with a conveyor comprising a pair of parallel chains 5, which are driven by sprockets not shown, but which are preferably mounted on transverse shafts at each end of the machine, which shafts are driven by any suitable source of power.

The two chains 5 are connected by a plurality of transversely extending cross members 6, which are provided with openings 7 in which the battery shells 8 fit and are held in position by spring fingers 9 fixed on the cross members 6.

At one end of the machine the shells 8 are inserted in spring fingers 9 on the cross members 6, by means of suitable mechanism or manually, and are held therein. The conveyor carries these shells along the length of the machine, and various mechanisms which may be mounted thereon act on the shells so that by the time the shells reach a position adjacent to the heating and cooling mechanism disclosed herein, each shell has had inserted within it a card board disk 10 and a core 11, and has also been filled with a liquid or semi-liquid or plastic solution which hardens or solidifies when the heating operation takes place. The filled shells are carried forward on the conveyor over idle sprockets 12 and downward through the heating tank 13. It is possible to construct a dry battery having contents which are hardened by cooling the same. In a case of this kind, the heating tank 13 would be filled with a cool liquid instead of a heated liquid and the core centering device hereinafter described will act while the cooling operation takes place.

The heating tank 13 is preferably filled with heated liquid such as water 14 which is sufficiently hot to make the liquid solution in the battery shells 8 harden therein, and is preferably regulated by a thermostat or other means to control its temperature. The water 14, or other liquid, in the tank may be heated by any suitable heating arrangement, such as gas, steam, electricity, or oil, and the tank may be provided with any well known form of valve so that in case of the stoppage of the machine the heating of the liquid will not be continued during the interrupted operation.

Bearings 14 and 15 are mounted on the side members 1 of the frame above the heating tank and in these bearings are mounted cross shafts 16 and 17. Mounted on the shaft 16 at each end thereof are sprockets 18, and a pair of like sprockets 19 are mounted on the shaft 17.

These sets of sprockets 18 and 19 depress the chains 5 so that as these chains move along they cause the shells 8 to descend downward and to be moved through the heated liquid 14 contained in the heating tank 13. The chains 5, however, do not pass through the water 14 as they are supported upon and slide on rails 20 supported on bars 21 secured on the inner face of the tank walls.

Mounted on the shafts 16 and 17 are pairs of sprockets 22 which are connected by chains 23, the chain 23 on one side of the machine being connected to the chain 23 on the opposite side by cross bars 24, these cross bars being placed the same distance apart as are the cross bars 6 on the conveyor chains 5, so that the same register in vertical alignment with one another during the heating operation.

Mounted on the cross bars 24 are a plurality of core centering guides 25, there being one of these guides on each cross bar 24 for each one of the shells carried on each cross bar 6. Each of the guides 25 is provided with a central opening 26 having a flared mouth 27.

As the conveyor chains 5 move forwardly and are depressed by the sprockets 13 and begin to cause the shells to descend into the heating tank 13, core centering guides 25 enter the mouth of each of the shells and the upper end of the core 11 in each shell enters the opening 26 in each guide, whereby the core is exactly centered in each shell and held centered during the heating operation so that after the liquid solution in each shell has hardened it will be found that the core is centrally positioned in the shell. The flared mouth 27 on each core centering guide 25 aids in causing the guide to engage the core 11 readily and furthermore it prevents a splashing or overflow of the liquid solution in the shells when it enters the mouth of the same. The exterior of each core centering guide 25 is preferably of an inverted truncated cone shape so as to assist it in entering the mouth of a receptacle when the receptacle rolls gear-like into engagement with the particular core centering guide that it is intended to engage with.

In the drawings, I have shown the guides 25 loosely fitting the upper end of the core 11. This looseness is in practice, merely a working fit, so that the core 11 is held positively centrally situated while the heating operation takes place. Adjacent the end of the heating tank 13 the core centering guides 25 mounted on the cross bars 24 which connect the chains 23, disengage from the shells 8, so that said shells are carried forward and away from the tank 13.

Thus when the shells reach the end of the heating tank 13, they are caused to be carried upward and out of the tank by the conveyor chains 5 which move over an idler sprocket 28. Thus it will be seen that the core centering device comes into operation at the beginning of the heating operation and ceases operation when the shells leave the heating tank.

The shells are then carried along by the conveyor 5 until they reach the cooling tank 29, which, in general construction, is similar to the heating tank, and which is provided with sprockets 30 and 31 mounted upon respective shafts 32 and 33, rotating in their respective bearings 34 and 35. These sprockets, shafts and bearings are identical with the sprockets 18 and 19, shafts 16 and 17, and bearings 14 and 15 of the heating arrangement.

The cooling arrangement acts to depress the chains over the sprocket 36, and cause the shells to be carried downward and along through cold liquid contained within the tank 29, from whence they are elevated out by means of the sprocket 37, and are thence carried along by the conveyor to any other mechanism for acting upon them, or to a mechanism which ejects them from the conveyor.

It will be obvious that the heating and cooling devices may be situated at any desired distance apart with any desired mechanisms interposed between them, or if desired the heating device may be used alone or on a machine independently of the cooling arrangement, and many other arrangements may be made without departing from the spirit of my invention.

Having described my invention, what I claim is:

1. In a machine of the class described, a conveyor for holding a plurality of receptacles, each of said receptacles being adapted to contain a core, a tank for containing a heated liquid, means for actuating the conveyor for moving the receptacles through said tank, and means for engaging the cores in the receptacles and holding the same centralized within said receptacles while said receptacles are being moved through the tank.

2. In a machine of the class described, a conveyor for holding a plurality of receptacles, each of said receptacles containing a core, means for heating said receptacles while the same are being carried by the conveyor and means for engaging the core in each of said receptacles and holding the same centrally positioned while the heating operation takes place.

3. In a machine of the class described, a conveyor for holding a plurality of receptacles, a tank containing heated liquid, and a tank for containing a cool liquid, means for causing the conveyor to carry said receptacles through the tank containing the heated liquid, and means for engaging a core in each of said receptacles and holding the same centrally positioned while the receptacles are being moved through the heated liquid and means for actuating the conveyor to cause the same to carry said receptacles through the tank containing the cool liquid after the completion of the heating operation.

4. In a machine of the class described, a conveyor for holding and carrying a plurality of receptacles, each of said receptacles having a core, a tank containing a heated liquid, means for causing the receptacles to be carried through the tank, and a core centering mechanism for centering the cores in the receptacles while the heating operation takes place, said centering device being adapted to come into operation at the beginning of the heating operation and ceasing operation at the completion of the heating operation.

5. In a machine of the class described, a conveyor for holding a plurality of receptacles, means for heating said receptacles while held on the conveyor and means moving co-extensively with the conveyor and holding a core centrally situated in each receptacle while the heating operation takes place.

6. In a machine of the class described, a conveyor for holding a plurality of receptacles, means for heating said receptacles while held on the conveyor, centering means moving co-extensively with the conveyor, and a plurality of projecting core centering guides on said centering means for receiving and holding a core centrally situated in each receptacle during the heating operation.

7. In a machine of the class described, means for holding a plurality of receptacles, means for heating said receptacles, and means for engaging and holding a core centrally situated in each receptacle while the heating operation takes place.

8. In a machine of the class described, a conveyor for holding a plurality of receptacles, means for heating said receptacles while held on the conveyor, means moving co-extensively with the conveyor and holding a core centrally situated in each receptacle while the heating operation takes place, and a cooling device to which the heated receptacles are carried by the conveyor.

9. In a machine of the class described, a conveyor for holding a plurality of receptacles, means for heating said receptacles comprising a tank of heated liquid through which the receptacles are carried, means moving co-extensively with the conveyor for receiving and centering a core in each receptacle while the receptacles are carried through the tank of heated liquid.

10. In a machine of the class described, a conveyor, a tank for holding heated liquid, and a tank for holding cool liquid, means on the conveyor for holding a plurality of receptacles, means for causing the conveyor to carry the receptacles through the heated liquid, and then through the cool liquid, and means for holding a core central in each receptacle while the receptacles are passing through the heated liquid.

11. In a machine of the class described, a conveyor for receiving and holding a plurality of battery shells, each of said shells containing liquid and a core, a tank containing a liquid of a temperature sufficient to harden or solidify the liquid in the receptacles, means for moving the receptacles through said tank, and means for holding the core in each receptacle in its central position while the hardening or solidification of the liquid in the receptacles takes place.

12. In a machine of the class described, a tank for containing liquid, a pair of parallel chains, cross bars connecting said chains, means on said cross bars for holding receptacles, means for moving said chains, means for depressing the chains and causing the same to move the receptacles carried on the cross bar through the liquid contained in the tank, means for entering the mouth of each receptacle carried on the cross bar and holding a core central therein while the receptacles are passing through the tank and means at the end of the tank for elevating the chains and causing the receptacles to be carried upward and out of the tank.

13. In a machine of the class described, means for holding a plurality of receptacles, means for causing a solidification of liquid contained in said receptacles and means for holding a core centrally situated in each receptacle while said solidification takes place.

14. In a machine of the class described, means for holding a plurality of receptacles, a tank containing a liquid through which said receptacles are moved to cause a solidification of liquid contained in the receptacles and means for holding a core centrally situated in each receptacle during the solidification of the liquid.

Signed at the city, county and State of New York, this 15th day of December, 1919.

LOUIS A. FREEDMAN.